J. B. COLVIN.
NUT LOCK.
APPLICATION FILED SEPT. 4, 1915.
1,190,114.
Patented July 4, 1916.
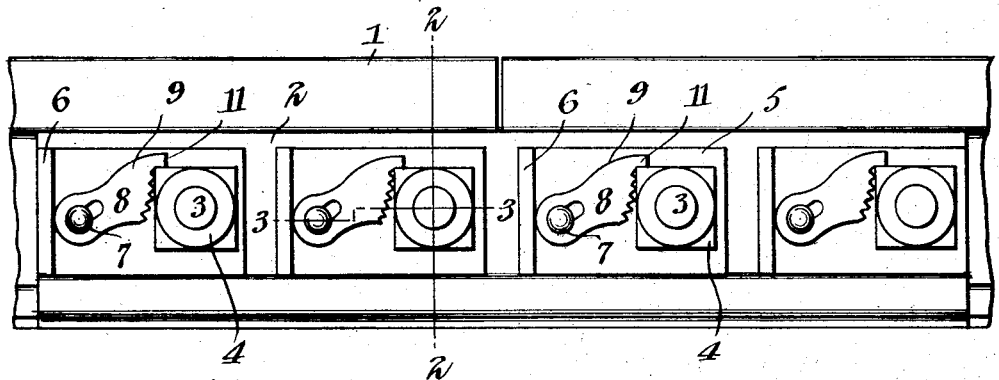
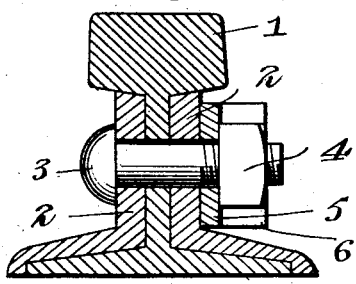
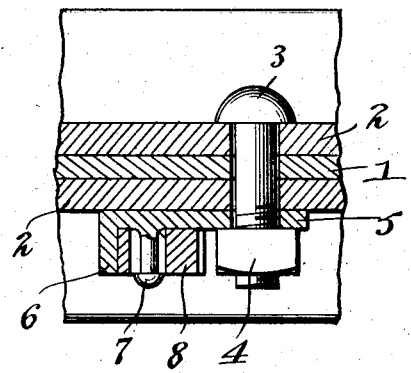
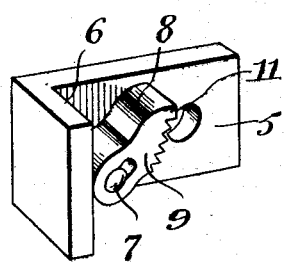
Witnesses
Frederick W. Ely
Allen F. Stevens
Inventor
J. B. Colvin.
By Victor J. Evans
Attorney

UNITED STATES PATENT OFFICE.

JOHN B. COLVIN, OF DUNDEE, MISSISSIPPI.

NUT-LOCK.

1,190,114. Specification of Letters Patent. Patented July 4, 1916.

Application filed September 4, 1915. Serial No. 49,054.

*To all whom it may concern:*

Be it known that I, JOHN B. COLVIN, a citizen of the United States, residing at Dundee, in the county of Tunica and State of Mississippi, have invented new and useful Improvements in Nut-Locks, of which the following is a specification.

The present invention relates to improvements in means for locking a nut upon a bolt.

An object of the invention is to provide a nut lock, primarily adapted for employment in connection with rail joints, which includes a flanged metallic body member, having an opening through which the bolt passes, the nut for the bolt pressing the said body against the fish plate for the rail, the body, at its flanged end having loosely pivotally connected therewith a dog, the said dog having a toothed face which is adapted, when the nut is screwed home upon the bolt to be swung into engagement with one of the faces of the nut to force one of the faces of the dog into contact with the flange of the body plate, and so effectively secure the nut in locked position upon the bolt, to also permit the ready removal of the nut from the bolt when desired.

Other objects and advantages will appear as the nature of the invention is more fully understood, reference being had to the accompanying drawing in which there is illustrated a simple and satisfactory reduction of the invention to practice.

In the drawing, Figure 1 is a view of a rail joint having the nuts locked upon the bolts in accordance with my invention. Fig. 2 is a sectional view approximately on the line 2—2 of Fig. 1. Fig. 3 is a horizontal sectional view approximately on the line 3—3 of Fig. 1. Fig. 4 is a perspective view of the improvement.

In the drawing 1—1 designates two rails having their opposite sides provided with fish plates 2, bolts 3 passing through openings in the fish plates and in the webs of the rails, while nuts 4 are provided for the bolts.

My improvement contemplates the employment of a body member or plate 5 having one of its edges outturned or otherwise formed with a flange 6. The plate 5 at what I will term the upper edge thereof and directly opposite the flange 6 is provided with a pintle 7 forming a pivot for a dog 8. The opening through which the pintle 7 passes is elongated and the said pintle is provided with a head so that while the dog is revoluble upon the pivot it is also longitudinally movable thereon, so that one of its ends may be forced into contact with the flange 6, in a manner and for a purpose presently to be set forth. The dog includes a substantially elongated body 9 and has its engaging face rounded and provided with teeth, and the said engaging face terminates in a lip 11 which is disposed at what I will term the top and outer corner of the dog. The plate 5 is provided with an opening through which one of the bolts 3 passes, it being understood that one of the locks is employed for each of the bolts and for each of the nuts upon the bolts. The threaded end of the bolt projects a suitable distance beyond the outer face of the body 5 and the nut 4 is screwed thereon and contacts with the outer face forcing the member 5 against the vertical member of the fish plate 4, and likewise its flange in tight contact with the flange or horizontal portion of the said fish plate.

It will be noted that after the nut 4 has been screwed home upon the bolt 3 and the dog 8 swung upon its pivot the toothed engaging face 10 thereon will be brought into contact with one of the sides of the nut 4. On forcing the dog into such contact the dog will be moved longitudinally permitting its lip 11 to rest upon the adjacent opposite side of the nut to that contacted by the toothed face of the dog and at the same time allow the end of the dog adjacent its pivot to engage with the flange 6 of the plate 5. This particular and peculiar arrangement of parts, it will be noted, provides a binding action between the dog and the nut and relieves the pivot 7 of stress or strain. It will be obvious that by swinging the dog in an upward direction, under pressure, the same may be brought out of engagement with the side of the nut to permit of the removal of the nut from the bolt and from the above description taken in connection with the drawing the simplicity and advantages of the structure will it is thought be apparent to those skilled in the art to which such inventions appertain, without further detailed description.

Having thus described the invention what is claimed is:—

The combination with a structure including a flanged member and a bolt passing through the same, and a nut for the bolt, of a plate arranged upon one of the faces of the structure and engaging with the flange thereof, said plate having an angular end and provided with a headed pivot member adjacent to said angular end, a dog having an elongated slotted portion receiving the pivot and having a toothed face to engage with one of the sides of the nut and a lip to engage with another side of the nut and said dog adapted to have one of its ends forced by the nut into contact with the angular end of the plate and to relieve the headed member from the strain of the pressure upon the dog between its end engaging with the nut and its end contacting with the angular portion of the plate, all as and for the purpose set forth.

In testimony whereof I affix my signature in presence of two witnesses.

JOHN B. COLVIN.

Witnesses:
TURNER WILLIAMS,
LONNIE C. SHANNON.

Copies of this patent may be obtained for five cents each, by addressing the "Commissioner of Patents, Washington, D. C."